INVENTOR.
ELIZABETH ANNE ULVANG MAITLAND

United States Patent Office 3,605,335
Patented Sept. 20, 1971

3,605,335
PLANTER KIT
Elizabeth Anne Ulvang Maitland, 15709 Chatham,
Detroit, Mich. 48223
Filed Dec. 2, 1968, Ser. No. 780,376
Int. Cl. A01g 9/22
U.S. Cl. 47—17                                    1 Claim

ABSTRACT OF THE DISCLOSURE

A kit including parts for constructing a transparent pet plantation in which plants can be placed for growth in sunlight, the kit including several panels of clear Plexiglas which is assembled into a container, a plurality of hinges, a roll of tape, glue, two plastic tubings, a tray, metal rings, clips, a latch assembly, chain and a carton of cardboard within which the kit is contained.

---

This invention relates generally to kits for assembly by home craftsmen and the like.

A principal object of the present invention is to provide a do-it-yourself pet plantation which comprises a kit that can be easily assembled by home craftsmen, a housewife or a child and, which when assembled, comprises a housing in which real flora placed in moss, has an opporunity to grow successfully.

Another object of the present invention is to provide a do-it-yourself pet plantation which includes two plastic tubes for delivering fresh air beneath the soil, within which the flora is rooted, thereby allowing the plantation to remain in a fresh condition without the necessity of being cleaned for a year or more.

Other objects of the present invention are to provide a do-it-yourself pet plantation which is simple in design, inexpensive to manufacture, rugged in construction, easy to use and efficient in operation.

These and other objects will be readily evident upon a study of the following specification and the accompanying drawing wherein.

Figure 1:
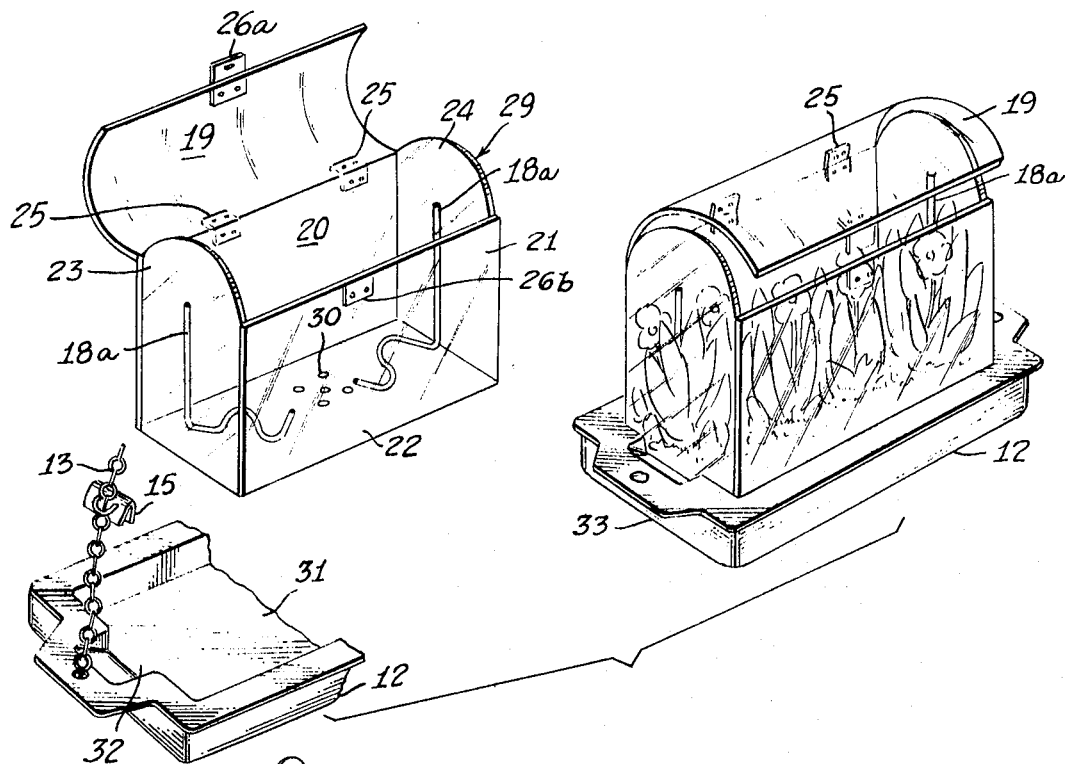
FIG. 1 shows an exploded perspective view of the housing and tray, and the same assembled and upon a supporting surface.

Referring now to the drawing in detail, the reference numeral 10 represents a do-it-yourself pet plantation according to the present invention wherein there is a kit 10a from which the pet plantation is made, the kit comprising a cardboard carton 11 in which there is contained a tray 12, a chain 13 with metal ring 14, a pair of clips 15, a roll of tape 16, glue 17, plastic tubing 18, a curved piece of plexiglass 19, a plurality of three rectangular Plexiglas panels 20, 21 and 22, a pair of Plexiglas end panels 23 and 24, a pair of hinges 25, a latch assembly 26 and a plurality of screws 27.

The components mentioned above comprise the parts for assembling the pet plantation 10 into which real flora 28, rooted in moss and earth, can be placed and maintained.

Figure 2:
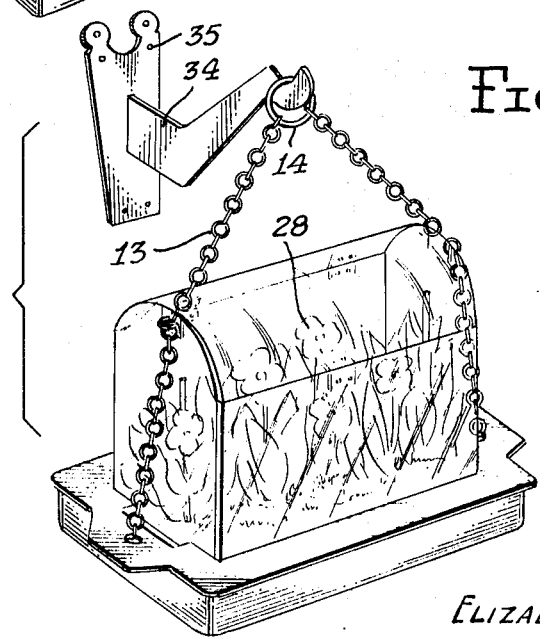
FIG. 2 is a perspective view of the pet plantation shown supported from an overhead bracket.

As shown in FIG. 2, the housing 29 is comprised of rectangular panels 20 and 21 forming the front and rear sides while the panel 22 comprises a bottom panel, the panel 22 having a plurality of openings 30, extending therethrough so as to allow water to drain outward of the housing. The side panels 23 and 24 are mounted upon opposite sides and the curved panel 19 is mounted by means of the hinges 25 to the rear panel 20. It is of course understood that all of the panels are made of clear, transparent Plexiglas so as to allow sunlight to pass therethrough and thus reach the plants growing within the housing. The tubing 18 is cut into two tubing members 18a, shown in FIG. 2, each of the tubing members providing a means for air to be admitted under the soil and thus maintain the same in a fresh condition for a relatively long period of time. The latch elements 26a and 26b, are secured upon the curved cover panel 19 and the front panel respectively. The latch elements 26a and 26b comprise the latch assembly 26.

The tray 12 has a central depression 31 into which the lower end of the housing is receivable. The depression has a notch 32 at each opposite end thereof so as to allow access of air to the depression and allow evaporation of water draining thereinto.

In FIG. 4, the pet plantation is shown supported upon a table 33 or other convenient surface, whereas in FIG. 5, the pet plantation is shown supported from a bracket 34 that can be conveniently mounted by means of screws 35 to a vertical wall. When the pet plantation is thus supported from the chain 13, it will be noted that the clips 15 are each positioned over the arcuate upper edge 36 over the side panels 23, as shown in FIG. 3 of the drawing in greater detail.

Thus there has been provided a do-it-yourself pet plantation which will provide amusement, interest and constructive knowledge to children and persons in the making and maintaining of a pet plantation. It is of course understood that various small animals such as salamanders or skinks may be maintained with the plants within the housing.

While various changes may be made in the detailed construction, it is understood that such changes will be within the spirit and scope of the present invention as is defined by the appended claim.

I claim:

1. A planter comprising a housing consisting of side, front, rear, and base panels interconnected to form a generally rectangular container, a top panel hinged to said rear panel, latch means on said top and front panels whereby said top panel may be releasably secured to said front panel, said panels being transparent, and said base panel having drain openings therein, soil within said housing, at least one flexible vent tube having its lower end disposed on said base panel beneath said soil, and its upper end protruding from the soil surface, a tray having side walls, a centrally depressed bottom wall and notched end walls, said housing being received within said tray, said tray end walls and housing end panels having means attached thereto to which a chain may be secured to suspend said tray and housing.

References Cited

UNITED STATES PATENTS

| 1,570,841 | 1/1926 | Karnatz | 47—34 |
| 2,720,725 | 10/1955 | Peerless | 47—14 |
| 3,095,670 | 7/1963 | Raab | 47—17 |

FOREIGN PATENTS

| 4,647 | 2/1909 | Great Britain | 47—35 |

ROBERT E. BAGWILL, Primary Examiner

U.S. Cl. X.R.

47—35